(12) United States Patent
Neidhardt et al.

(10) Patent No.: US 7,443,801 B2
(45) Date of Patent: Oct. 28, 2008

(54) REMOTE ESTIMATION OF ROUND-TRIP DELAYS IN A DATA NETWORK

(75) Inventors: Arnold L. Neidhardt, Middletown, NJ (US); Yegnanarayanan Chandramouli, East Brunswick, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 849 days.

(21) Appl. No.: 10/975,641

(22) Filed: Oct. 28, 2004

(65) Prior Publication Data

US 2006/0092850 A1    May 4, 2006

(51) Int. Cl.
    *H04J 1/16* (2006.01)
(52) U.S. Cl. .................... 370/238; 370/252
(58) Field of Classification Search ............. 370/238, 370/252
    See application file for complete search history.

(56) References Cited

U.S. PATENT DOCUMENTS

| 6,212,171 | B1* | 4/2001 | LaFollette et al. | 370/257 |
| 6,590,869 | B1* | 7/2003 | Beyda et al. | 370/248 |
| 6,775,240 | B1* | 8/2004 | Zhang et al. | 370/251 |
| 6,958,977 | B1* | 10/2005 | Mitrani et al. | 370/252 |
| 2005/0030900 | A1* | 2/2005 | Schwarzbauer et al. | 370/238 |

OTHER PUBLICATIONS

N.G. Duffield, et al., "Network Delay Tomography from End-to-end Unicast Measurements," in Proccedings of the 2001 International Workshop on Digital Communications 2001-Evolutionary Trends of the Internet, Taormina, Italy, Sep. 2001.

M. Coates, et al., "Sequential Monte Inference of Internal Delays in Nonstationary Communication Networks," in IEEE Trans. Signal Processing, Special Issue on Monte Carlo Methods for Statistical Signal Processing, Jan. 2001.

O. Gurewitz, et al., "Estimating One-Way Delays From Cyclic-Path Delay Measurements," IEEE Infocom 2001, Anchorage, AK, Apr. 2001.

Y. Tsang, et al., "Network Delay Tomography," IEEE Transaction of Signal Processing in Networking, Aug. 2003.

* cited by examiner

*Primary Examiner*—Andrew Lee
(74) *Attorney, Agent, or Firm*—Philip J. Feig

(57) ABSTRACT

Disclosed is a technique for data network congestion diagnosis using remote estimation of round-trip delays. A monitoring node transmits test messages between network nodes and measures the transit times between when the test messages are transmitted from, and when they return to, the monitoring node. A path delay between network nodes is determined based on the measured time delays. The techniques for determining network path delay are also utilized in conjunction with a three phase test procedure for diagnosing network congestion problems. Due to various network topologies and routing tables, certain confirmatory checks may be required to determine whether the procedures of the first or second phase test procedures are appropriate for particular path segments. Further, queuing delays may be determined by subtracting traffic independent delays from the measured transit times of the test messages, and such queuing delays may be used to determine the path delays. Such traffic independent delays may be determined during periods of low network traffic.

13 Claims, 8 Drawing Sheets

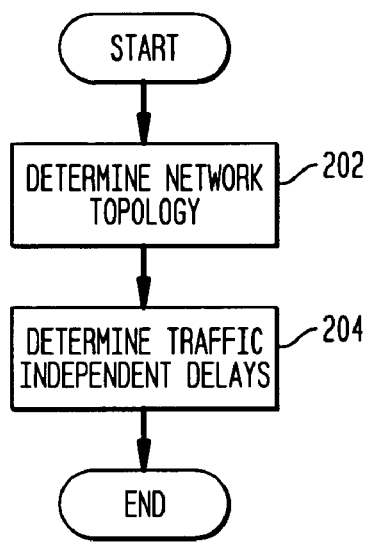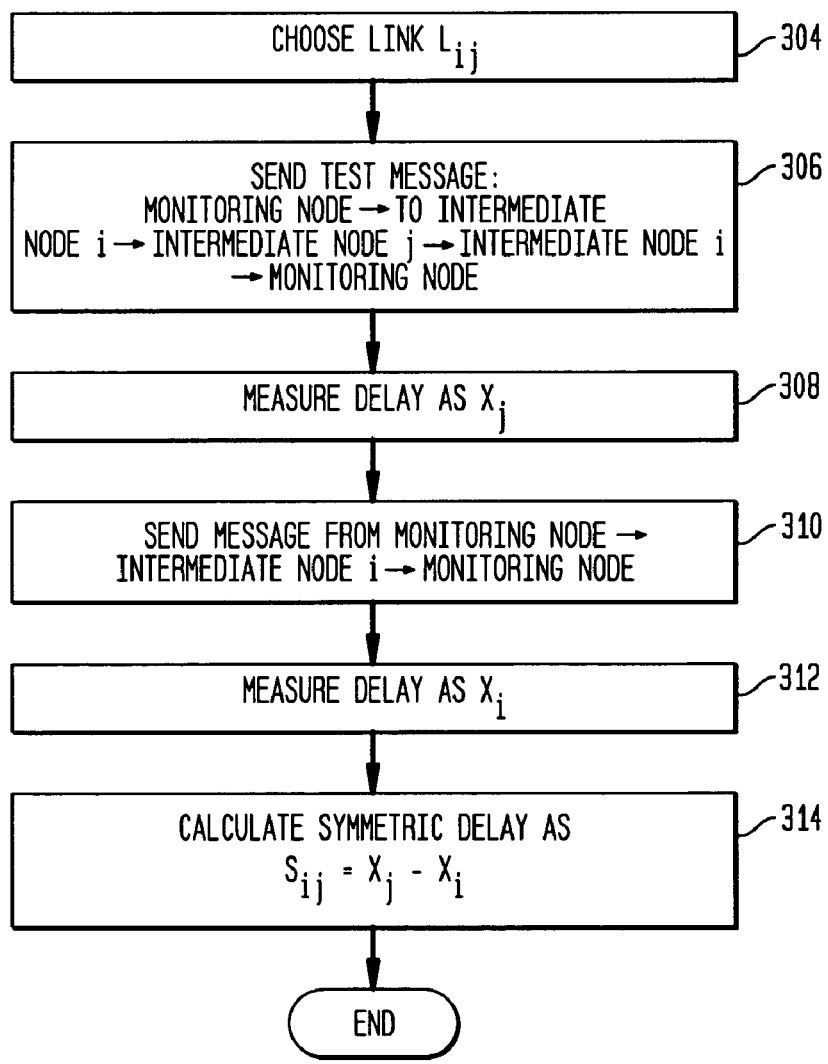

REMOTE ESTIMATION OF ROUND-TRIP DELAYS IN A DATA NETWORK

BACKGROUND OF THE INVENTION

The present invention relates generally to data networks, and more particularly to estimating round trip path segment delay in a data network.

Quality of Service (QoS) is becoming increasingly important to e-commerce companies doing business over the Internet (or other data networks). Such companies offer various services to their customers over the Internet, including the ability to perform commercial transactions. These companies generally maintain one or more web servers which provide the online functionality to their customers. The connectivity of these web servers to the Internet is provided by Internet service providers (ISP). Since much of the success of an e-commerce company depends upon the quality of the connection of their web servers to the Internet, such companies are interested in negotiating service level agreements (SLA) with their ISPs. An SLA defines the level of service which the ISP will provide to the company and may guarantee some minimum QoS to the e-commerce company.

The increasing popularity of SLAs then raises the issue of how to enforce an SLA and how to monitor the QoS being provided to the e-commerce company by the ISP. Perceived network congestion may be due to various network elements, some of which may be the responsibility of the ISP under the SLA, and others of which are not the responsibility of the ISP and not guaranteed by the SLA. Thus, the mere detection of end to end network delay does not necessarily implicate the SLA, as the ISP may not be the party responsible for the portion of the network causing the delay.

An e-commerce company may monitor the QoS being provided by an ISP under an SLA, or the e-commerce company may engage the services of a third party to monitor the QoS being provided by the ISP. Either way, the party monitoring the service is not the network service provider, and therefore does not have access to all of the network diagnostic tools at the disposal of the network provider. As such, it is generally difficult for a third party observer to accurately pinpoint the portion of a data network causing delays.

There is a need for a technique which allows a third party observer to detect congestion in a data network and to be able to determine which network path segments, or particular links, are the cause of network delays.

BRIEF SUMMARY OF THE INVENTION

The present invention provides an improved technique for diagnosing network congestion.

In accordance with an embodiment of the invention, a monitoring node is utilized for determining a path delay between two network nodes. The monitoring node transmits a first test message which traverses a path to a first network node, a second network node, back to the first network node, and returning to the monitoring node. The monitoring node measures the time delay between transmission and receipt of the first test message. The monitoring node transmits a second test message which traverses a path to the first network node and then returns to the monitoring node. The monitoring node measures the time delay between transmission and receipt of the second test message. A path delay between the first and second network nodes may be determined based on the two measured time delays.

The techniques for determining network path delay may also be utilized in conjunction with a three-phase test procedure for diagnosing network congestion problems, in accordance with another embodiment of the invention. During a first phase, a first set of nodes between the source and destination nodes that are shared by both a forward path from the source node to the destination node and a reverse path from the destination node to the source node are identified. Path delays between nodes in the first set are then calculated in order to identify a reduced set of possible suspect path segments that are causing the congestion. Next during a second phase, a second set of nodes within the reduced set of possible suspect path segments that are not shared by both the forward path from the source node to the destination node and the reverse path from the destination node to the source node are identified. Path delays between nodes in the second set are then calculated in order to further reduce the set of possible suspect path segments. Finally, during a third phase, link delays of the links remaining in the further reduced set of possible suspect path segments are calculated.

During the first phase of the test procedure particular path segments may be excluded from the set of possible suspect path segments if the path delay associated with the particular path segment is relatively small. If the path delay associated with a particular path segment is sufficiently large during the first phase of the test procedure, then the complementary path segment(s) of the measured path segment may be excluded from the set of possible suspect path segments. During the second phase of the test procedure, path segments may be excluded from the set of suspect path segments if their path delays are relatively small. The tests of the first and second phases may be repeated, with each iteration reducing the set of possible suspect path segments by approximately one-half.

In accordance with another aspect of the invention, due to various network topologies and network routing tables, certain confirmatory checks may be required to determine whether the procedures of the first or second phase test procedures are appropriate for particular path segments.

In accordance with another aspect of the invention, queuing delays may be determined by subtracting traffic independent delays from the measured delay times of the test messages, and such queuing delays may be used to determine the path delays. Such traffic independent delays may be determine during periods of low network traffic.

These and other advantages of the invention will be apparent to those of ordinary skill in the art by reference to the following detailed description and the accompanying drawings.

BRIEF DESCRIPTION OF THE DRAWINGS

FIG. 2 shows a flowchart of the steps performed during a first part of network congestion diagnosis;

FIG. 3 shows a flowchart of the steps performed in order to determine bi-directional (symmetric) link delays in a network during network diagnosis in accordance with an embodiment of the invention;

DETAILED DESCRIPTION

Figure 1:
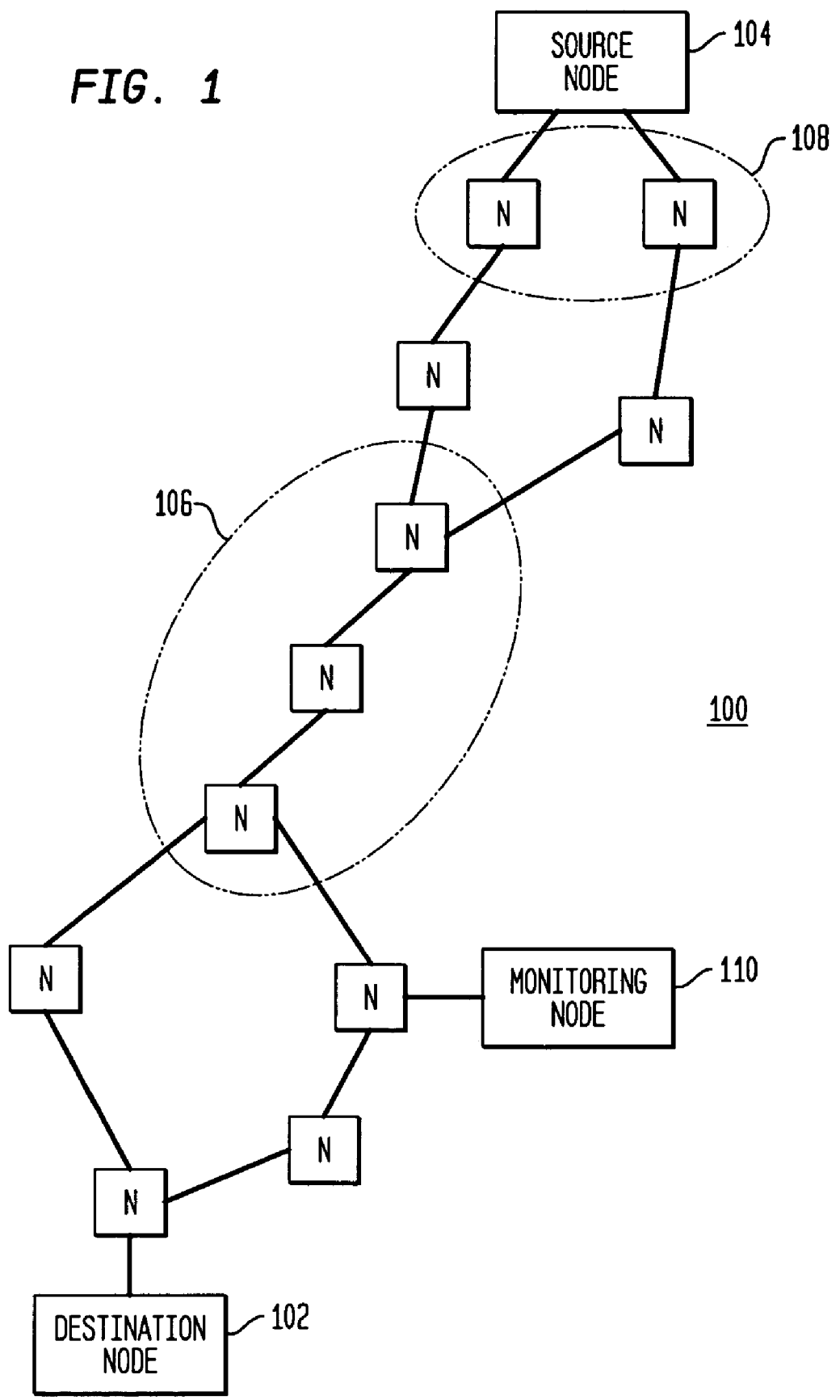
FIG. 1 shows a packet data network in which the principles of the present invention may be implemented.

FIG. 1 shows a packet data network 100 in which the principles of the present invention may be implemented. Network 100 contains multiple network nodes which are connected by network links. Networks, such as network 100, are well known in the art of data networking. Nodes (generally shown in FIG. 1 as "N") in such networks are generally network routers which receive data packets and forward the data packets on toward their final destination via another router. Routers are generally implemented using standard network interfaces and their operation is controlled by one or more processors executing computer program instructions. The implementation of data networks, including network routers, is well known in the art and will not be described in detail herein.

Figure 5:
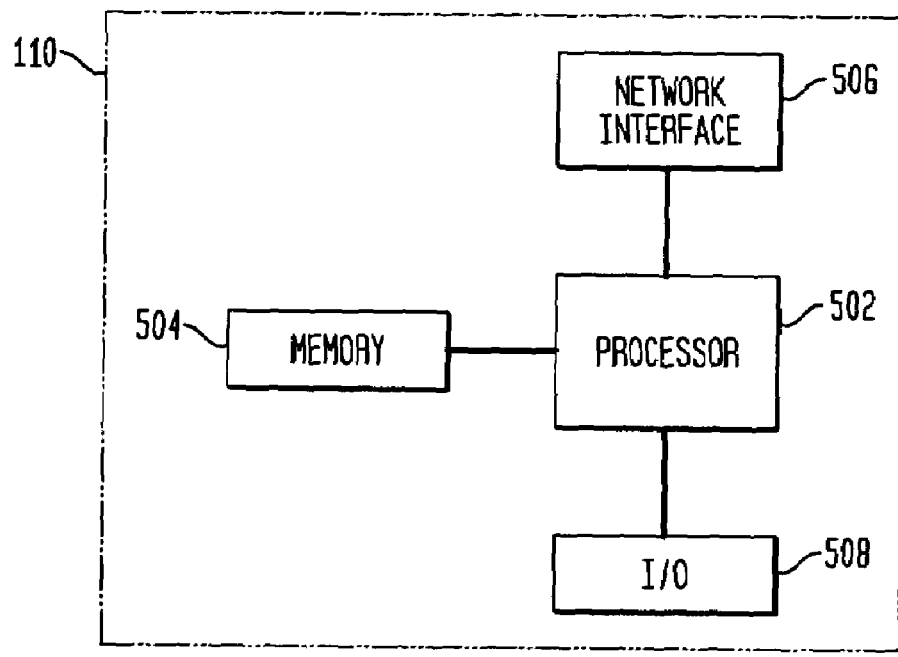
FIG. 5 shows a high level block diagram of an exemplary embodiment of a monitoring node.

Consider source node 104 (which may be, for example, a server of an e-commerce company) and destination node 102 (which may be, for example, a point of presence (POP) used to connect user computers to the data network). Further, consider monitoring node 110 which may be used in accordance with the principles of the present invention to estimate path segment delays in the network. Monitoring node 110 may be implemented using a programmable computer using standard network interfaces. A high level block diagram of an exemplary embodiment of a monitoring node 110 is shown in FIG. 5. In FIG. 5, monitoring node 110 comprises a processor 502 (or multiple processors) which controls the overall operation of the monitoring node 110. Such operation is defined by computer program instructions stored in a memory 504 and executed by processor 502. The memory 504 may be any type of computer readable medium, including without limitation electronic, magnetic, or optical media. Further, while one memory unit 504 is shown in FIG. 5, it is to be understood that memory unit 504 could comprise multiple memory units, with such memory units comprising any type of memory. Monitoring node 110 also comprises a network interface 506 which provides for communication of data packets between monitoring node 110 and a data network. Monitoring node 110 also comprises one or more input/output devices, represented in FIG. 5 as I/O 508, for allowing interaction with a user of monitoring node 110. A network node implemented as a programmable computer, as shown in FIG. 5, is well known in the art and the details of such a network node will not be described in further detail herein.

Returning now to FIG. 1, a third party having access only to monitoring node 110 may want to monitor the path between source node 104 and destination node 102 to diagnose network delays and determine the location of links causing delays. One motivation for this may be if a portion (e.g., portion 106) of the network 100 is the responsibility of a particular network service provider (e.g., ISP) with which the e-commerce company has an SLA in place. If roundtrip delay (between source node 104 and destination node 102) is detected, it is desirable to determine which portion of the network is causing the delay. For example, if it is determined that the cause of the delay is within network portion 106, then the e-commerce company may contact the ISP responsible for that portion of the network. Now consider network portion 108 which is administered by the e-commerce company. If it is determined that the cause of the delay is within portion 108 of the network 100 then the delay would not be the responsibility of the aforementioned ISP. In any event, as can be seen from FIG. 1 and the accompanying description, it is important to be able to detect not only that network delays exist, but the particular portion of the network causing the delays.

Network diagnosis in accordance with an embodiment of the invention comprises two parts. The first part is network topology discovery and the second part is actual measurements during periods of congestion. The first part is required in order to determine the various paths between a source node and a destination node. Also as part of this first part, and as will be described in further detail below, measurements of traffic independent delays are estimated so that network congestion delays may be better isolated during the measurement part.

FIG. 2 shows a flowchart of the steps performed during the first part. First, in step 202, the network topology is determined. Network topology is determined using the traceroute command, which is a well known internet utility that traces the network route between a source node and a destination node. The output of the traceroute utility, which is also referred to as a "traceroute", shows each "hop" (an Internet router or another host computer) between the two end-points and the round-trip time it took for a packet to be bounced off of that hop. Thus, traceroute is used to discover the routing and intermediate links used in the end to end path between a given source and destination in the network. Generally, traceroute is executed using one parameter with a command of the form: traceroute d, where d is the destination node and the command is executed at the source node.

In order for the traceroute command to accurately trace the network route used by the network to reach a specified destination, each of the routers in the route must support notification for the expiration of a packet's time to live. This is because when the traceroute command is executed at a source node to find the route to a specified destination node, the source node launches a sequence of test packets toward the destination node with different values in the packets' time to live field, which is actually a limit on the number of hops to be used (not a limit on the physical time taken), so that each packet will exhaust its limit at a different node on the route to the destination. When a router receives a packet that is just exhausting its time to live, the router is supposed to send a notification to the packet's source that the packet's time to live has expired, together with an identification of the router where the expiry occurred. The source node can trace the route to the originally specified destination by collecting the notifications for all the time to live expirations of all the test packets. In order to accurately discover the network topology using this technique, the routers in the network must be configured to supply notification of time-to-live expirations, as well as their own identity in these notifications.

Traceroute may also be used to discover paths other than the path identified by the aforementioned traceroute command between the source and destination node. This can be accomplished by using the traceroute command in conjunction with loose source routing. In general, loose-source-routing allows the source of a data packet to give some loose guidance to the network for routing the packet. More particularly, a source node may include in a packet's IP header an indicator of the use of the loose source routing option, together with a list of nodes, which generally requires the network to route the packet to its ultimate destination by using a route that visits all the nodes of the list in the listed order. The routing is loose in the sense that the network is allowed to employ additional nodes on the route if successive nodes on the list are not immediate neighbors in the network. When loose source routing is used in conjunction with the traceroute utility, it allows the discovery of other paths between a source node s and a destination node d. More particularly, using loose source routing in conjunction with traceroute it is possible to direct a traceroute packet to a specific intermediate node on its way to the destination node. Thus, a command of the form traceroute-g i d executed at a source s, can be used to find the route taken by a packet from the source s to the destination d by way of intermediate node i. Similarly, the command traceroute-g d s, executed at a source s, can be used to determine the round-trip path from s back to itself using d as an intermediate node.

As will be described in further detail below, the embodiment being described herein measures end to end delay along various specific paths between the monitoring node and another network node. This is performed using a customized Internet message which utilizes loose source routing. As will be seen from the description below, these specialized path messages allow a third party network observer to obtain end to end delay measurements along various end to end paths between a source node s and a destination node d. The delay measurement is determined by comparing the time of transmission of the message and the time of its return.

It is noted that the network delay observed from end to end measurements consists of two components: queuing delay resulting from network congestion and traffic independent delays (e.g., transmission and propagation). Since a party monitoring network performance is generally interested in queuing delays rather than traffic independent delays, it is helpful to know the traffic independent delays in advance so that they can be removed from the observed delay. Thus, the second step 204 of the flowchart of FIG. 2 is the determination of these traffic independent delays, which may be determined as follows.

It is noted that in traversing a path p, the observed delay will be the sum of the queuing delay and the traffic independent delay. Assuming stable network routing, multiple test packets will be transmitted along the same path. As such, the minimum of the observed end to end delays along any path will be almost equal to the traffic independent delay. Moreover, the minimum of the observed end to end delays along a path will be equal to the traffic independent delay of a path if any of the test packets encounter queue lengths of zero at all hops along the path. The chance of having one of the packets encounter this minimum delay rises with the number of packets being launched. Further, the chance of having one of the packets encounter this minimum delay rises further if the test is performed during a period of relatively light network load. Thus, in accordance with step 204 of FIG. 2, the traffic independent related delays along the various network paths of interest are estimated "off-line", during periods when the network is not congested.

FIG. 3 shows a flowchart of the steps performed in order to determine the bi-directional (symmetric) link delays in a network during network diagnosis in accordance with an embodiment of the invention. As set forth in the following description, the embodiment described in conjunction with FIG. 3 describes the steps for determining bi-directional link delays based on measured round trip end to end delays. A round trip end to end delay is the sum of the forward path delay and the reverse path delay. An ideal solution would be able to individually characterize the forward path and the reverse path based on the round trip measurements. However, the determination of one way delays requires more resources than is likely to be regarded as practical. In most practical network implementations, symmetric round trip link delays are adequate for diagnosis of congestion problems. Therefore, FIG. 3 describes the steps for determining bi-directional link delays based on measured round trip end to end delays.

Figure 4:
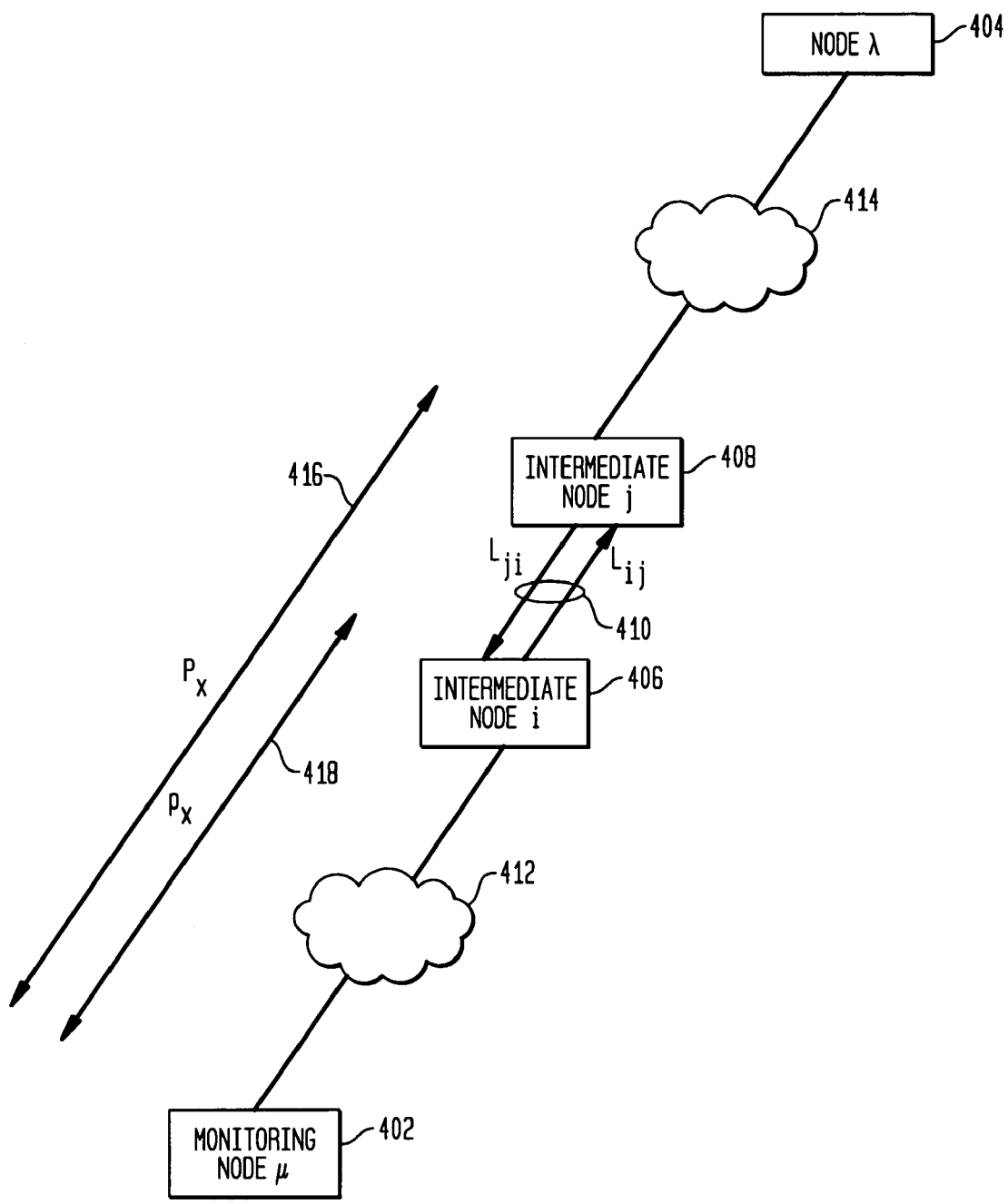
FIG. 4 shows an exemplary data network topology.

The steps of the flowchart of FIG. 3 will be described in conjunction with the network of FIG. 4. Referring to FIG. 4, consider a monitoring node μ 402 and a node λ 404. The end to end routing path between the monitoring node μ 402 and node λ 404 may be discovered as described above in step 202 of FIG. 2 using the traceroute utility with the loose source routing option. More particularly, the command traceroute-g λ μ may be launched from monitoring node μ 402 to determine the round trip path from μ back to itself using λ as an intermediate node. From this traceroute test, it is possible to determine the intermediate nodes used in the forward path from μ to λ and also the reverse path from λ to μ. Assume for purposes of description that the link of interest is link 410 interconnecting two intermediate nodes i 406 and j 408. Bidirectional link 410 may be referred to as two uni-directional links, with the link from intermediate node i 406 to intermediate node j 408 being referred to as $L_{ij}$ and the link from intermediate node j 408 to intermediate node i 406 being referred to as $L_{ji}$. One skilled in the art will recognize that there may be other intermediate nodes in the path from monitoring node μ 402 to node λ 404. These other intermediate nodes are not shown in FIG. 4, but are represented by network clouds 412 and 414. In addition, one skilled in the art will also recognize the possibility that only one of the directions of link 410 may turn out to be of interest, in the sense of being used by the round-trip route between μ and λ.

Assuming that network delay has been detected, the links in the path may be tested as will now be described in conjunction with FIG. 3. First, in step 304, a particular link is chosen for analysis. In the present example, assume that link 410 is chosen for evaluation. In step 306, a test message is sent from monitoring node μ 402 that will traverse intermediate node i 406, link $L_{ij}$, intermediate node j 408, link $L_{ji}$, intermediate node i 406, and back to monitoring node μ 402. The message may utilize loose source routing with an initial destination of intermediate node i 406, but with the header of the packet using the loose source routing option to specify that the route be extended successively, after reaching the intermediate node i 406, to intermediate node j 408, to intermediate node i 406, and back to monitoring node μ 402. In this manner, a delay $X_j$ may be measured from monitoring node μ 402 to intermediate node j 408 and back as represented by step 308. It is noted once again that the delay $X_j$ of interest is the queuing portion of the delay, and as such, since the traffic independent delay is known from the determinations made in step 204 of FIG. 2, the traffic independent delay portion of the end to end path delay from monitoring node μ 402 to intermediate node j 408 and back may be removed.

Next, in step 310, a test message is sent from monitoring node μ 402 that will traverse intermediate node i 406 and then back to monitoring node μ 402 without traversing link 410 to and from intermediate node j 408. The test message may utilize loose source routing with an initial destination of intermediate node i 406, but with the header of the packet using the loose source routing option to specify that the route be extended back to monitoring node μ 402 after reaching intermediate node i 406. In this manner, a delay $X_i$ may be measured from monitoring node μ 402 to intermediate node i 406 and back as represented by step 312. Again, the delay $X_i$ of interest is the queuing portion of the delay, and as such, since the traffic independent delay is known from the determinations made in step 204 of FIG. 2, the traffic independent delay portion of the end to end path delay from monitoring node μ 402 to intermediate node i 406 and back may be removed.

It should be understood that the steps of FIG. 3 have so far determined the bi-directional link delay from the measurement of round trip end to end delays on two closely related paths: a short path $p_x$ from monitoring node μ 402 to intermediate node i 406 and back; and a longer path $P_x$ from monitoring node μ 402 to intermediate node j 408 and back. The short path $p_x$ and longer path $P_x$ are represented graphically in FIG. 4 as 418 and 416 respectively. The delay on path $P_x$ was measured in step 308 as $X_j$ and the delay on path $p_x$ was measured in step 312 as $X_i$. Therefore, as represented in step 314, the symmetric delay on link 410 ($S_{ij}$) may be calculated as $S_{ij}=X_j-X_i$.

In general, the path segment between monitoring node μ 402 and intermediate node i 406 could be relatively long and could even differ in the two directions (to intermediate node i 406 and from intermediate node i 406), but the key requirements are that the same segments between monitoring node μ 402 and intermediate node i 406 be used in calculating both $X_j$ and $X_i$, and the path $P_x$ 416 use only the direct link 410 between intermediate node i 406 and intermediate node j 408. As long as these requirements are met, $S_{ij}$ may be calculated as $S_{ij}=X_j-X_i$.

Using the above described technique, a third party observer can determine round trip link delays. In many network situations, knowledge of round trip link delays is sufficient to accurately diagnose network problems. For example, if a particular link is found to have an excessive bidirectional delay, and the same ISP is responsible for both directions of the link, then it can be determined that the particular ISP should be contacted regarding the delay.

In the procedure described above for testing an individual link, the step 304 for choosing a link to test may be made on any basis, which might be as elementary as successively choosing each of the links on a route of interest. However, in most practical network implementations, there is a relatively long path including many hops between the monitoring node and the destination node. As such, it is usually inefficient to perform the steps of FIG. 3 for each link in the path. Thus, as will now be described in connection with FIGS. 6, 7A, 7B, and 7C, in an advantageous embodiment a three phase technique is used to diagnose network congestion.

Figure 6:
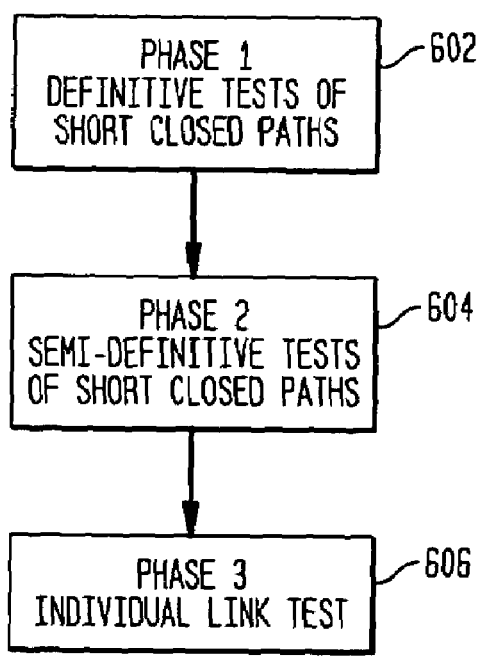
FIG. 6 shows a high level flowchart of a three phase technique for network congestion diagnosis.
Figure 7A:
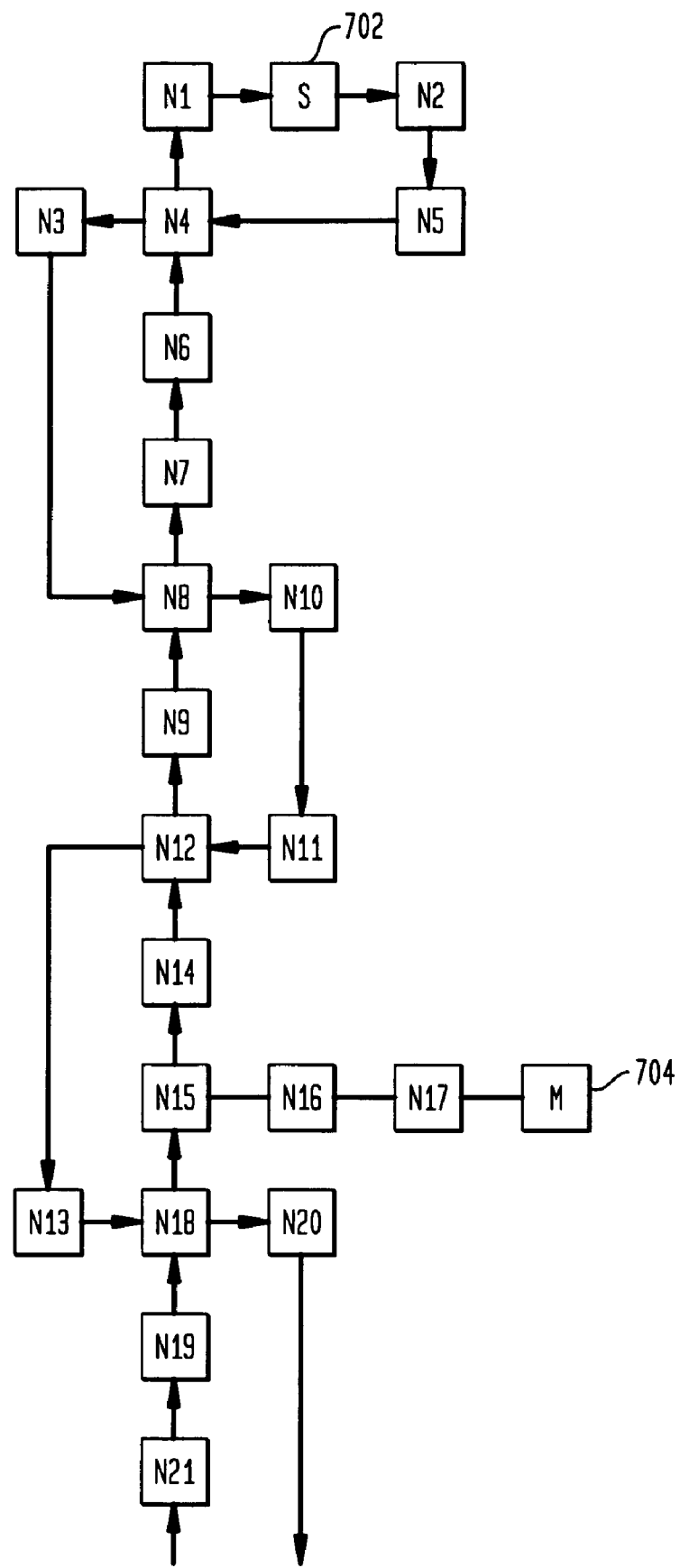
FIGS. 7A-C show an exemplary data network topology.
Figure 7B:
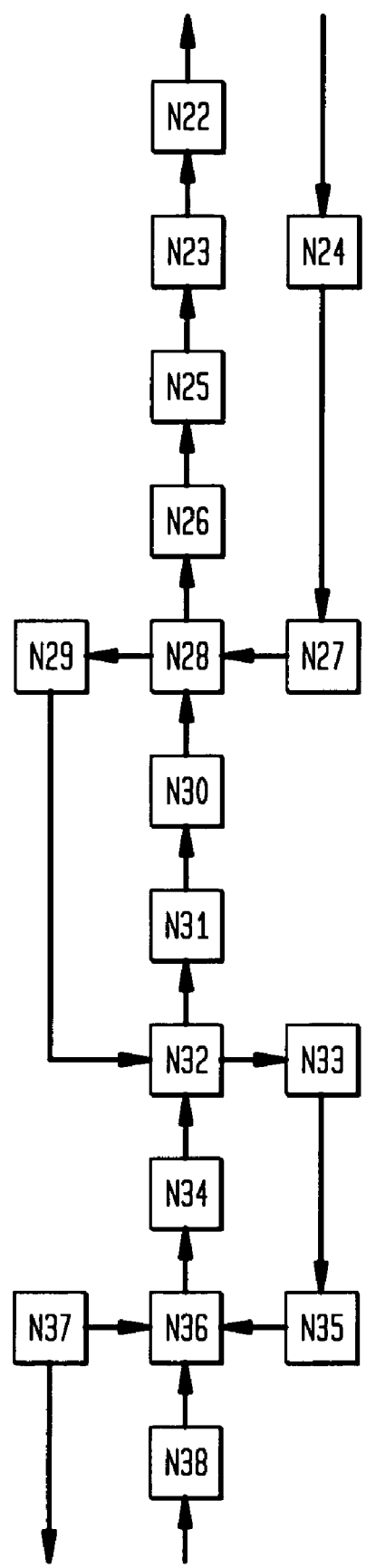
Figure 7C:
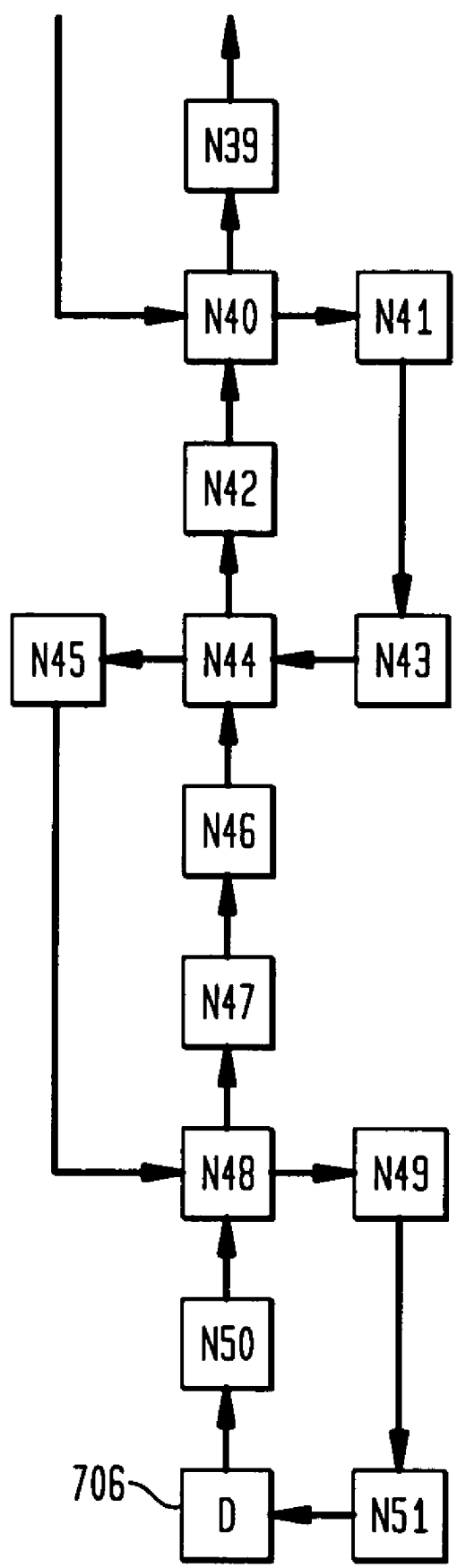

A high level flowchart of the three phase technique for network congestion diagnosis is shown in FIG. 6, and the three phase technique will be described in conjunction with the exemplary network shown in FIGS. 7A, 7B and 7C. FIGS. 7A, 7B and 7C are to be read as a single figure oriented vertically with FIG. 7A at the top, FIG. 7B in the middle, and FIG. 7C at the bottom (and all three of the FIGS. 7A, 7B, 7C will sometimes be referred to herein as FIG. 7.) FIG. 7 shows a source node 702, a monitoring node 704, and a destination node 706. The nodes connecting the source node 702, monitoring node 704, and destination node 706 are shown in FIG. 7 and each of these nodes are identified by a number (N#). FIG. 7 also shows the directional links interconnecting the nodes. FIG. 7 shows the main routes of interest, together with the links on one of the paths that might connect the monitoring node 704 with the main route, but for clarity purposes, FIG. 7 omits other links of the network. Now, consider a path between source node 702 and destination node 706. If network delay is observed for packets being transmitted between the source and destination, it would be readily recognized by one skilled in the art that there are many suspect links that could be causing the delay. Therefore, testing each of the links individually using the technique described above in connection with FIG. 3 would take a long time and use substantial resources. In accordance with an advantageous embodiment, the three phase technique of FIG. 6 is used to reduce the number of suspect links for testing with relatively few tests. It is noted that this presumes that when a typical problem arises, usually only a single link is the cause of the problem.

Figure 8:
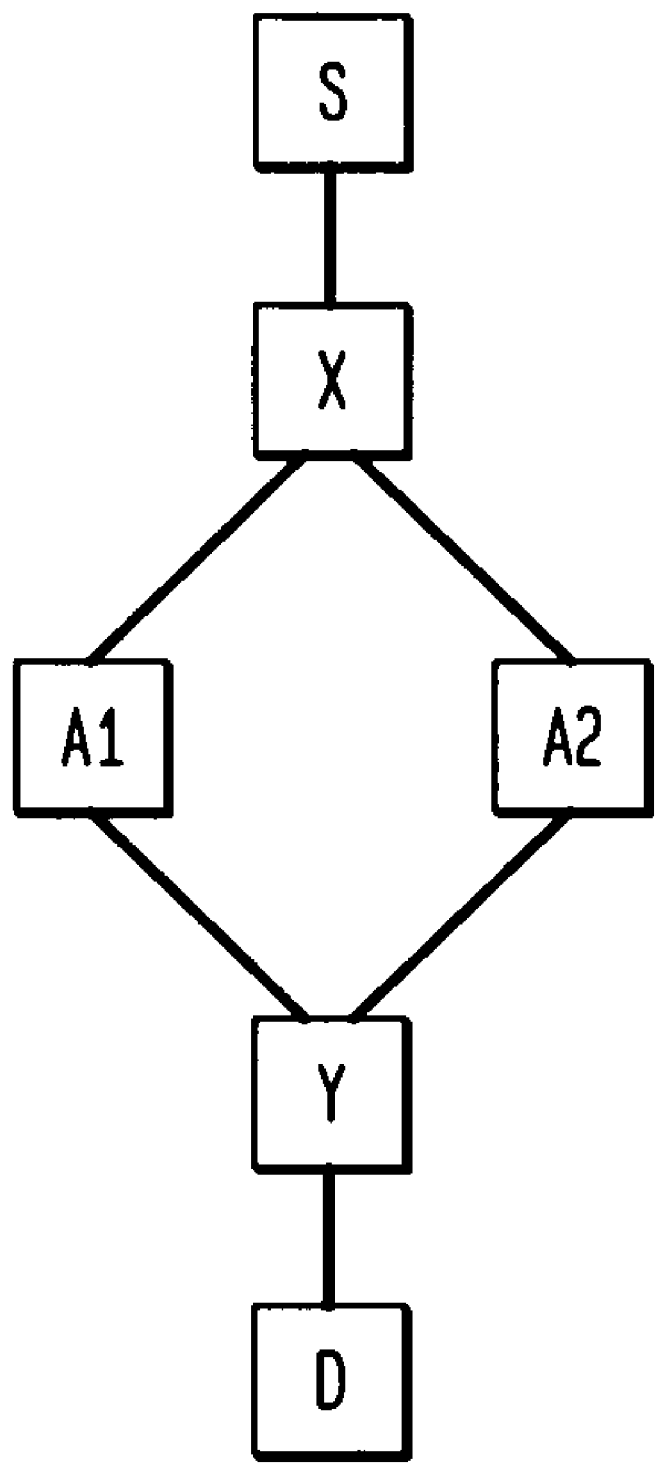
FIG. 8 shows an exemplary data network topology.

As a preliminary matter, it is noted that the technique described in FIG. 3 determined bidirectional link delays. As will now be described in conjunction with FIGS. 7-8, a technique similar to that described in connection with FIG. 3 is used in phase 1 (602) and phase 2 (604) to determine path delays rather than link delays. One skilled in the art will recognize that the technique described in FIG. 3 can be extended to determine path delays between two nodes X and Y as follows. Note that nodes X and Y do not need to be neighbor nodes and there may be a number of nodes in the path between X and Y. In order to determine the path delay between nodes X and Y from monitoring node M, first the delay is measured for a test message sent as follows: M→X→Y→X→M (delay 1). Next, the delay is measured for a test message sent as follows: M→X→M (delay 2). Delay 1−Delay 2=the path segment delay between nodes X and Y. The principles for calculating path delay in this manner are similar to the principles for calculating link delay as described above in connection with FIG. 3.

Returning now to FIG. 6, the first phase 602 proceeds as follows. It is noted that as used herein, the term "closed" path has its common meaning of any path for which the final point equals the starting point. Also, as used herein, the terms "large" and "short" are used as relative terms to describe the lengths of the paths. When the investigation begins, all the links are suspects, and, if there is just one problem link, the most efficient way to localize the trouble would be to do a binary search, performing a test, at each step of the investigation, that tests roughly half the suspects remaining at that step. The problem is that, with forward routes not always matching reverse routes, it is not always possible to test exactly a precise set of suspects. Initially, however, such tests can typically be performed. Accordingly, the procedure of Phase 1 602 is first to identify the list of nodes on the "large" closed path S→D→S that are shared by both the forward path S→D and the reverse path D→S. Using the example of FIG. 7, this list of shared nodes is S, N4, N8, N12, N18, N28, N32, N36, N40, N44, N48, and D. For any two shared nodes on this list, A and B, a test of the path segment A→B→A is an exact test, in the sense that all the links in this closed path are suspects for the originally noticed delay on the "large" closed path S→D→S. A test of the "short" closed path A→B→A, which would be done by subtracting the delay for M→A→M from the delay for M→A→B→A→M, yields a test that is definitive for these suspects: if the delay is tolerably small, the links in A→B→A can be dropped from the suspect list; if the delay is large, then the links in A→B→A are retained as suspects. Moreover, if the difference between the two large delays (for A→B→A and for S→D→S, or, in place of S→D→S, for a segment A'→B'→A' intermediate between A→B→A and S→D→S [assuming a previous test had localized the suspects to this intermediate segment A'→B'→A']) is sufficiently small, then the links outside A→B→A can be dropped from the suspect list. It is this last possibility of using a test of one set of suspects to drop links outside the tested set (i.e., complementary links) that distinguishes this initial phase of the search. For instance, for the example network of FIG. 7, this first phase might proceed as follows.

Initially, the current suspect list for problem links would be all of the links in the path from S→D→S. The first test in the first phase may be to test the path segment from S→N28→S. N28 is a good choice for this test because it is an approximate midpoint between S and D and will therefore be able to narrow down the suspect links by about half. Assuming this test results in a sufficiently high delay, then the new set of suspect links becomes the links on the path S→N28→S and the links in the path N28→D→N28 are excluded as suspect links. The process is then repeated and the next test may be to test the path segment from S→N12→S. N12 is a good choice for this test because it is an approximate midpoint between S and N28 and will therefore be able to again narrow down the suspect links by about half. Assuming this test results in a relatively low delay, then the new set of suspect links becomes the links on the path N12→N28→N12 and the links in the path N12→S→N12 are excluded as suspect links. The process is then repeated and the next test may be to test the path segment from N12→N18→N12. Assuming this test results in a relatively low delay, then the new set of suspect links becomes the links on the path N18→N28→N18 and the links in the path N12→N18→N12 are excluded as suspect links. It is noted that the suspect path N18→N28→N18 is a "short" closed path without intermediate shared nodes on the forward and reverse path (i.e., intermediate relative to N18 and N28 as the end points). The first phase of the investigation now ends because no more tests of "short" closed paths between shared nodes can reveal more information.

In the second phase 604, tests are made of suspect path segments between nodes X and Y on the original "large" closed path S→D→S, but, because X and Y are not both shared by the forward and reverse path of the original S→D→S, the "short" closed path X→Y→X is likely to include, in addition to the suspects on X→Y, some "bystanders" on Y→X (i.e., links that do not occur on the original "large" closed path S→D→S). As described above, a test of X→Y→X consists of subtracting the delay for M→X→M from that for M→X→Y→X→M. Yet, given the asymmetry in the discussion here of treating Y→X as perhaps possessing "bystanders" while X→Y is full of suspects, it is worthwhile to notice that an alternative test for the same information is to subtract the delay for M→Y→M from that for M→Y→X→Y→M, and this alternative test could be quicker and more accurate if M is closer to Y than to X. In any case, the implication of the presence of "bystanders" is that if the delay X→Y→X turns out to be large, then one cannot use this information to drop any suspects from outside this path. The test is still worthwhile to perform, because if the delay X→Y→X turns out to be small, then the links of X→Y can be dropped as suspects, as well as any links of Y→X that happen to be used on the original "large" closed path S→D→S (typically in the direction opposite to that of X→Y). Once again, given the likelihood that there is just one problem link, it is worthwhile to be ambitious and make tests of relatively long segments X→Y in the hope that a single test can clear many links simultaneously. In other words, it is appropriate to perform tests that test nearly "half" of the remaining suspects in any one test, except that, because the list of remaining suspects is becoming fragmented, and because a result with a large delay is no longer helpful, the "halves" should typically be less than half.

Continuing the example from above, the second phase of testing segments that are both longer than just one link and between nodes that are not both shared, might proceed as follows. At the end of phase 1, the suspect list of links is N18→N28→N18, which is the starting suspect list for phase 2. The first test may be the links on the path segment N22→N18→N22, which may be implemented by subtracting the delay for M→N18→M from the delay for M→N18→N22→N18→M, because M is closer to N18. Assuming the result of this test returns a relatively low delay, then the links in the test path segment N22→N18→N22 may be removed from the suspect list. In particular, N22→N18 can be removed, and, depending on the route used by the network for N18→N22, and in particular, on whether any suspects happen to be on this route, then these suspects may also be removed. For concreteness in this example, and remembering that FIG. 7 basically does not show any off-the-main-route links or nodes, suppose that the route selected by the network for N18→N22 is N18→N20→H→N22 for some off-the-main-route node H. In particular, notice that this route includes the link N18→N20 that is a suspect just before the test of N22→N18→N22. So the exoneration, by this test, of all the links on N22→N18→N22, includes the exoneration of N18→N20. As a result, the new suspect list becomes N20→N28→N22. The next test may be the links on the path segment N25→N22→N25. Assuming the results of this test returns a relatively high delay, then no information is determined by this test and the suspect list remains N20→N28→N22. The next test may be the links on the path segment N28→N25→N28. Assuming the result of this test returns a relatively low delay, then the links on the test path segment N28→N25→N28 may be removed from the suspect list. As a result, the new suspect list becomes N20→N28+N25→N22. The next test may be the links on the path segment N24→N28→N24. Assuming the result of this test returns a relatively low delay, then the links on the test path segment N24→N28→N24 may be removed from the suspect list. As a result, the new suspect list becomes N20→N24+N25→N22, and phase 2 ends because any further reduction of suspects would naturally use tests of individual links.

The last phase, phase 3 (606), is to check the individual links remaining in the suspect list. The tests of individual links are basically like those in the second phase: each is a test of a "short" closed path X→Y→X that is mainly intended to test a segment X→Y of the original "large" closed path S→D→S. Since tested paths have to be closed, and the reverse portion Y→X is typically not on the original "large" closed path S→D→S, the tested path X→Y→X is typically not confined to suspects alone. One difference from the second phase is that, with X and Y being neighboring nodes, one can be sure that the two routes X→Y and Y→X are each just single-hop routes, with the two hops being just the two directions of the X-Y link. More importantly, if the result of the test of X→Y→X is an excessively large delay, then the result is interpreted as a "conviction" of the suspect link X→Y as being a problem link. Continuing with the example of FIG. 7, each of the 3 remaining suspect links N20→N24, N25→N23, and N23→N22 would be tested separately to determine the problem link(s).

Thus, in summary, the phases of the test procedure shown in FIG. 6 are as follows. Phase 1 comprises definitive tests of "short" closed paths X→Y→X between nodes X and Y shared by the forward and reverse paths of the original "large" closed path S→D→S. Phase 2 comprises semi-definitive tests of "short" closed paths X→Y→X between nodes X and Y that are not both shared and are not neighbors where a low delay excludes the links of X→Y→X from the suspect list and a high delay gives no information. Phase 3 comprises tests of individual links X→Y→X where X and Y are neighbors and where a low delay excludes the X-Y link from the suspect list and a high delay results in a determination that the X-Y link is a problem link. It is noted here that while the phase 1 tests are "definitive" for the likely conditions mentioned earlier (a network with typically few congested links, with an end-to-end route of interest having at most one congested link, and with problematic delays always being due to just one very congested link), if these conditions are not met, then it is possible that the delay measured in a phase 1 test will not be sufficiently low to exonerate the segment being tested, and will not be sufficiently high such that it exonerates the complement of the segment being tested, but the delay will be intermediate, such that no suspect gets exonerated. It is further noted that as long as the purpose of the diagnosis is merely to identify an ISP responsible for the high delay, then testing may end as soon as the current suspect list is reduced just enough to be within the domain of a single ISP.

Having described the overall three phase test procedure above, it is noted here that several confirmation checks are necessary, and if such tests fail, then certain adjustments to the above described three phase test procedure are required. Such confirmation checks and required adjustments will now be described in conjunction with FIG. 8 which shows source node S, destination node D, and intermediate nodes X, A1, A2 and Y. The general concern is that if a path segment (P1) from node X to node Y is part of a longer route (F) from node S to node D, then it is not necessarily true that the network, from node X, would forward packets destined for Y on the segment P1 that the network uses for forwarding packets from X that are destined for D. For example, referring to FIG. 8, for the destination D, the routing table at X might have packets destined for Y sent to node A1 next, while the packets destined for D are sent to node A2. However, the routing table at Y may have packets destined for both S and X sent to the same node A2. In such a case, X and Y both occur on both the forward and reverse segments of the route between S and D (and would otherwise be candidates for the phase 1 test described above), but a test of X→Y→X would not test the correct links and should not be included as a phase 1 test because when the test route X→A1→Y→A2→X uses a link (e.g., either of the links from X to A1) that is not used on the main route being diagnosed, then even very high delays cannot be used to exclude any links as suspect links in phase 1. Similarly, in phase 2, merely because a segment (P1) from X to Y appears on the route being diagnosed does not mean it can be tested with the test X→Y→X.

For the reasons described in the preceding paragraph, confirmation tests are required to check that a test of X→Y→X is testing the desired path from X to Y (note that this test is not required if X and Y are neighbors). This test may be performed using the well known traceroute utility as described above. If the test fails (i.e., it cannot be confirmed that a test of X→Y→X is testing the desired path from X to Y), then certain adjustments are required to the 3 phase test described above. First, if X and Y are shared nodes, but the path used by X→Y→X is not the desired path, then the test of X→Y→X cannot be interpreted using the phase 1 technique, but instead must be interpreted using the phase 2 technique, which exonerates any suspect links that appear on the path used by X→Y→X if the measured delay is low, but which does not exonerate the complement if the measured delay is high. Similarly, during phase 2 testing, if it is desired to test a segment P1 from X to Y of the original route, but the traceroute confirmation test of X→Y and Y→X fails because it reveals different path segments, then at best, the test of X→Y→X can be used to exonerate only those suspects of the original route that show up on the route that traceroute shows to be employed by the test X→Y→X. In some cases it may happen that some (typically relatively short) multi-hop segments cannot be efficiently tested except through the tests of the individual links of the segment.

Thus, summarizing the confirmation checks and adjustments, it is seen that the phase 1 test is applied to nodes that are not merely shared by the forward and reverse paths of the route being diagnosed, but also have the property of employing routes between one another that are segments of the route being diagnosed. Further, phase 2 applies to unshared nodes as well as to those shared nodes which fail the confirmation test and therefore cannot be tested in phase 1. Thus, the above described 3 phase test must be adjusted based on the results of the confirmation tests as described herein.

In one embodiment, the packet sizes of the test messages may be specified as follows, with reference to the network of FIG. 4 and the messages described in conjunction with FIG. 3 for measuring the bi-directional delay of link 410. For the packet traversing the path from nodes μ→i→j→i→μ: the minimum IP header size is 20 bytes; the loose source specification for a message specifying a route from nodes μ→i→j→i→μ requires 16 bytes; the suggested size for a sequence number for a test packet is 4 bytes; thus resulting in a test message size of 40 bytes. For the packet traversing the path from nodes μ→i→μ: the minimum IP header size is 20 bytes; the loose source specification for a message specifying a route from nodes μ→i→μ requires 8 bytes; the suggested size for a sequence number for a test packet is 4 bytes; thus resulting in a test message size of 32 bytes.

There are several qualifications on the accuracy of the herein described technique stemming from the fact that the technique solves the problem of identifying bi-directional link delays while making measurements only of round trip end to end path delays from just one node (the monitoring node), where the bidirectional delay of a link joining two nodes is the sum of the delays that would be encountered in traversing the link in both of its directions. Given the problem of diagnosing an instance of degraded service in the form of an observation of excessive delay on some round trip end to end path of interest, the embodiment described herein may identify all the bidirectional link delays for all the links on the path of interest, and then identify those links whose individual bi-directional link delays are excessive. In many cases, this technique is successful in diagnosing excessive path delays, but errors in the diagnosis can arise because the technique deals with bi-directional link delays, while the link delays contributing to a given path delay are all unidirectional delays. This fact is especially important in the common case of a round trip end to end path not using the same links for its outbound and inbound portions. Since the technique deals with bi-directional delays while unidirectional delays are the relevant ones, three types of errors can arise, as follows. First, if the two directions of a link are administered by different ISPs, and if the technique identifies the link as having an excessive bi-directional delay, then the technique will have failed to provide a complete diagnosis. Next, if just one direction of a link is used on a degraded round-trip path whose diagnosis is being sought, and if that direction of the link is contributing to the degradation with a modestly excessive delay while the other direction of the link has a small enough delay to offset the modest excess and result in a bi-directional delay that is not excessive, then the technique will fail to identify the link as contributing to the degradation (i.e. the link is a false negative). Finally, if just one direction of a link is used on a degraded round trip path whose diagnosis is being sought, but that direction has a small delay while the opposite direction has such a large delay as to make the link's bi-directional delay excessive, then the technique will identify the link as having an excessive bi-directional delay, giving the false impression that the link contributed to the original degradation (i.e., the link is a false positive). It is noted that the falsity in this case is only with respect to the contribution to the degradation on the original path of interest, because the link nevertheless has an excessive delay in at least one direction.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for diagnosing network congestion between a source node and a destination node comprising the steps of:
    identifying a first set of nodes between the source and destination nodes that are shared by both a forward path from the source node to the destination node and a reverse path from the destination node to the source node;
    calculating path delays between nodes in said first set of nodes to identify a reduced set of possible suspect path segments;
    identifying a second set of nodes within said reduced set of possible suspect path segments that are not shared by both the forward path from the source node to the destination node and the reverse path from the destination node to the source node;
    calculating path delays between nodes in said second set of nodes to identify a further reduced set of possible suspect path segments; and
    calculating link delays of links remaining in said further reduced set of possible suspect path segments.

2. The method of claim 1 wherein said step of calculating path delays between nodes in said first set of nodes to identify a reduced set of possible suspect path segments further comprises the step of excluding a particular path segment from said possible suspect path segments if a calculated path delay associated with said particular path segment is relatively small.

3. The method of claim 1 wherein said step of calculating path delays between nodes in said first set of nodes to identify a reduced set of possible suspect path segments further comprises the step of excluding a path segment from said possible suspect path segments if a calculated path delay associated with a complement path segment is sufficiently large.

4. The method of claim 1 wherein said step of calculating path delays between nodes in said second set of nodes to identify a further reduced set of possible suspect path segments further comprises the step of excluding a particular path segment from said further reduced set of possible suspect path segments if a calculated path delay associated with said particular path segment is relatively small.

5. The method of claim 1 wherein said step of calculating path delays between nodes in said first set of nodes to identify a reduced set of possible suspect path segments is performed repeatedly, with each iteration reducing the set of possible suspect path segments by approximately one-half.

6. The method of claim 1 wherein said step of calculating path delays between nodes in said second set of nodes to identify a further reduced set of possible suspect path segments is performed repeatedly, with each iteration reducing the set of possible suspect path segments by approximately one-half.

7. The method of claim 1 further comprising the step of:
    performing a confirmation check to determine whether a path delay calculated on a particular path segment between nodes in said first set of nodes is a path delay of a relevant path segment between said source node and destination node and if not, then excluding said particular path segment from said possible suspect path segments if said path delay is relatively small but not excluding a complementary path segment from said possible suspect path segments if said path delay is relatively large.

8. The method of claim 1 further comprising the step of:
    performing a confirmation check to determine whether a path delay calculated on a particular path between nodes in said second set of nodes is a path delay of a relevant path segment between said source node and destination node and if not, then excluding from said possible suspect path segments only those portions of the particular path that are also portions of the relevant path segment between said source node and destination node.

9. The method of claim 1 wherein said steps of calculating path and link delays further comprise the steps of:
    transmitting a first message from a monitoring node, said first message traversing a path to a first node, to a second node, back to said first node, and returning to said monitoring node;
    measuring a first transit time from when the first message is transmitted from said monitoring node to when said first message returns to said monitoring node;
    transmitting a second message from said monitoring node, said second message traversing a path to said first network node and returning to said monitoring node;
    measuring a second transit time from when the second message is transmitted from said monitoring node to when said second message returns to said monitoring node; and
    determining said path delay based on said first transit time and said second transit time.

10. The method of claim 9 further comprising the steps of:
    determining a first queuing delay by subtracting a traffic independent delay portion of said measured first transit time from said measured first transit time;
    determining a second queuing delay by subtracting a traffic independent delay portion of said measured second transit time from said measured second transit time; and
    wherein said path delay is determined using said first and second queuing delays.

11. The method of claim 10 wherein said traffic independent delays include propagation delays.

12. The method of claim 10 further comprising the step of determining said traffic independent delays during periods of low network traffic.

13. The method of claim 9 wherein said first and second messages specify at least part of a network path utilizing loose source routing.

* * * * *